US009226256B2

(12) United States Patent
Velev et al.

(10) Patent No.: US 9,226,256 B2
(45) Date of Patent: Dec. 29, 2015

(54) DETACHMENT OF A MOBILE TERMINAL FROM A MOBILE COMMUNICATION SYSTEM

(75) Inventors: Genadi Velev, Darmstadt (DE); Jens Bachmann, Oberursel (DE); Takahisa Aoyama, Kanagawa (JP); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 198 days.

(21) Appl. No.: 13/996,844

(22) PCT Filed: Mar. 20, 2012

(86) PCT No.: PCT/EP2012/001224
§ 371 (c)(1),
(2), (4) Date: Sep. 16, 2013

(87) PCT Pub. No.: WO2012/136311
PCT Pub. Date: Oct. 11, 2012

(65) Prior Publication Data
US 2014/0003348 A1 Jan. 2, 2014

(30) Foreign Application Priority Data

Apr. 5, 2011 (EP) .................................... 11002844

(51) Int. Cl.
*H04W 60/06* (2009.01)
*H04W 68/00* (2009.01)
(Continued)

(52) U.S. Cl.
CPC .............. *H04W 60/06* (2013.01); *H04W 68/00* (2013.01); *H04L 12/56* (2013.01); *H04W 4/22* (2013.01); *H04W 28/02* (2013.01)

(58) Field of Classification Search
None
See application file for complete search history.

(56) References Cited

U.S. PATENT DOCUMENTS 6,463,055 B1 10/2002 Lupien
2007/0037569 A1 2/2007 McNiff
(Continued)

FOREIGN PATENT DOCUMENTS

EP 2 293 630 A1 3/2011

OTHER PUBLICATIONS

Nokia Siemens Networks: "Key Issue for Infrequent Transmission", 3GPP Draft; S2-110778 Simtc Infrequent Transmission Key Issue, 3rd Generation Partnership Project (3GPP), Mobile Competence Centre; 650, Route des Lucioles; F-06921, Sophia-Antipolis Cedex; France. vol. SA WG2, No. Salt Lake City; Feb. 15, 2011.
(Continued)

*Primary Examiner* — Kodzovi Acolatse
(74) *Attorney, Agent, or Firm* — Pearne & Gordon LLP

(57) ABSTRACT

Methods for detaching a mobile terminal from a mobile communication network. Furthermore, the invention also relates to a mobile terminal and a mobility management entity that perform these methods. The invention is inter alia applicable to a 3GPP LTE-A system following the Evolved Packet System (EPS) architecture. The invention proposes that the detach procedure of a mobile terminal is triggered by the mobile terminal being transferred into idle state. The mobility management entity can trigger the detach procedure in response to this event. The detach procedure may be deferred by a given time span. A detach timer may be configured in the mobile terminal and the mobility entity for this purpose, and upon expiry of the detach timer in the mobile terminal and the mobility management entity, both silently delete the context information related to the mobile terminal's user plane and control plane to detach the mobile terminal.

14 Claims, 4 Drawing Sheets

(51) Int. Cl.
*H04L 12/54* (2013.01)
*H04W 4/22* (2009.01)
*H04W 28/02* (2009.01)

(56) References Cited

U.S. PATENT DOCUMENTS

| | | | |
|---|---|---|---|
| 2010/0118752 A1* | 5/2010 | Suzuki et al. | 370/311 |
| 2011/0075675 A1* | 3/2011 | Koodli et al. | 370/401 |
| 2011/0110308 A1* | 5/2011 | Liang et al. | 370/328 |
| 2011/0116477 A1* | 5/2011 | Wu | 370/331 |

OTHER PUBLICATIONS

Nokia Siemens Networks: "Keep MTC devices offline in non-communication status", 3GPP Draft; S2-110779 Simtc Keep MTCdevice Offline, 3rd Generation Partnership Project (3GPP), Mobile Competence Centre; 650, Route des Lucioles; F-06921 Sophia-Antipolis Cedex; France vol. SA WG2, no. Salt Lake City; Feb. 15, 2011.
3GPP: "3rd Generation Partnership Project; Technical Specification Group Services and Systems Aspects; System Improvements for Machine-Type Communication; (Release 11)", 3GPP Draft; 23888-101-CL, 3rd Generation Partnership Project (3GPP), Mobile Competence Centre; 650, Route des Lucioles; F-06921 Sophia-Antipolis Cedex; France, vol. SA WG2, no. Salt Lake City; Feb. 15, 2011.
European Search Report issued in Application No. EP 11 00 2844 dated Sep. 23, 2011.
International Search Report issued in Application No. PCT/EP2012/001224 dated May 16, 2012.

* cited by examiner

DETACHMENT OF A MOBILE TERMINAL FROM A MOBILE COMMUNICATION SYSTEM

FIELD OF THE INVENTION

The invention relates to methods for detaching a mobile terminal from a mobile communication network. Furthermore, the invention also relates to a mobile terminal and a mobility management entity that perform these methods. The invention is inter alia applicable to a 3GPP LTE-A system following the Evolved Packet System (EPS) architecture.

TECHNICAL BACKGROUND

3GPP Long Term Evolution (3GPP LTE)

The $3^{rd}$ generation Partnership Project (3GPP) organization specifies the architecture of mobile cellular networks like Global System for Mobile Communications (GSM) and Universal Mobile Telecommunications System (UMTS). The latest mobile network architecture defined by the 3GPP is called Evolved 3GPP Packet Switched Domain—also known as the Evolved Packet System (EPS). The EPS combines an Evolved Packet Core (EPC) network that is able to connect a new generation of an access network technology called Evolved Universal Terrestrial Radio Access Network (E-UTRAN) as well as the pre-successor of the E-UTRAN called Universal Terrestrial Radio Access Network (UTRAN). A description of the EPS can be found in 3GPP TS 23.401: "General Packet Radio Service (GPRS) enhancements for Evolved Universal Terrestrial Radio Access Network (E-UTRAN) access", version 10.2.1, January 2011 (available at http://www.3gpp.org and incorporated herein by reference). FIG. 1 gives an overview on the entities and interfaces between the entities of the EPS. The 3GPP mobile network architecture provides two data packet gateways located in the EPC supporting the user equipment's mobility: The Serving Gateway (SGW) and Packet Data Network Gateway (PDN-GW, also abbreviated PGW below). The SGW terminates the interface towards the radio access networks, e.g. the UTRAN or the E-UTRAN. The mobility within one radio access network (UTRAN or E-UTRAN) is access specific and not described in this document. The mobility within the EPC is managed by the PGW. As described in 3GPP TS 23.401, the mobility management in the EPC between the PGW and the SGWs can be based either on the Proxy MIPv6 (PMIP) protocol or on the GPRS Tunneling Protocol (GTP). The PGW performs the function of Local Mobility Anchor (LMA) in case of PMIPv6 and the function of GTP tunnel endpoint in case of GTP. The interface between the SGW and the PGW is called S5 and it can be based either on the GTP or the PMIPv6 protocol. The PGW further performs IP address allocation to the user equipment (UE) and packet filtering (e.g. deep packet inspection, packet screening, etc.) in order to map the user equipment's traffic to appropriate QoS level In the 3GPP mobile network the mobile terminal (i.e. the user equipment) is attached to the access network via the NodeB in the UTRAN access and via the evolved NodeB (eNodeB) in the E-UTRAN access. The NodeB and eNodeB entities are known as base station in other mobile networks. A common denotation for the NodeB and eNodeB used in this document is (e)NodeB. Assuming the E-UTRAN access, the eNodeB entity is connected through wired lines to one or more SGWs via the S1-U interface ("U" stands for "user plane") and to the Mobility Management Entity (MME) via the S1-MME interface. The S1-U interface is based on the GTP protocol.

In the older releases of the 3GPP-based cellular network it was usual that the base stations, (e)NodeBs, are fixed connected to the core network. However, in the future cellular network architectures it could be possible to have a wireless (e)NodeBs that have smaller coverage area than the usual fixed (e)NodeBs. Further in this document the wireless (e)NodeBs are called Relay Nodes (RN). The (e)NodeB can be referred as a macro cell and the relay node as a micro cell because the relay node has a smaller coverage footprint. A cellular network that consists of multiple cells with different characteristics (e.g. macro cells, micro cells or pico cells) can be called heterogeneous network.

EPS Connection Management States

When a mobile terminal (called user equipment in the 3GPP terminology) is attached to the mobile communication network), the user equipment is in REGISTERED state, i.e. an EPS Mobility Management (EMM) context has been established and a default EPS bearer context has been activated in the user equipment. When a user equipment is in REGISTERED state, the user equipment can be in two different connections management states: IDLE and CONNECTED state. When the user equipment is switched-off or not attached to the mobile communication network, the user equipment is in DEREGISTERED state. In DEREGISTERED state, no EMM context exists in the mobility management entity (MME) and the user equipment location is unknown to an MME. Hence, the user equipment not reachable by an MME.

Generally, when the user equipment is attached (REGISTERED state), there is a user equipment context stored at least in the core network, i.e. in the MME, serving gateway (S-GW) and PDN gateway (P-GW)—see FIG. 1. The expression "user equipment context" means that there is user equipment-related information, e.g. security parameters, location, session management information (bearer context, QoS parameter, IP configuration, etc.), etc. stored in the core network entities. When the user equipment detaches from the network, i.e. when the user equipment goes to DEREGISTERED state, this user equipment context in the core network entities is deleted.

The user equipment is in IDLE state when there has been no data or signaling for transmission in the uplink and downlink for a certain time. In idle state radio resources of the user equipment are released and the corresponding context information on the radio connection is deleted in user equipment and the radio access network, i.e. the eNodeB. However, the user equipment's context in the core network is still maintained: The user equipment has still a valid IP configuration, which means the user equipment has session management context and also the core network entities has user equipment's session context.

A user equipment in IDLE state doesn't have a radio association (i.e. Radio Resource Connection, RRC) with the eNodeB. Therefore, there are no established signalling bearers and data bearers (i.e. context information are not available in the radio access network). Further, there is no Non-Access Stratum (NAS) signaling connection between the user equipment and the network (e.g. to the MME). Likewise, there is no S1-U connection between the eNodeB and the SGW.

In the IDLE state, the network (e.g. MME) assigns for each user equipment an area consisting of one or multiple cells (controlled by one or more eNodeBs) where the user equipment may move without performing any signaling to the network, i.e. the network just knows that the user equipment is within this area but does not know the exact location. In the 3GPP EPS architecture, a tracking area (TA) is identified by a tracking area identifier (TA ID) that is broadcasted by all cells forming the tracking area. One or multiple cells may be configured with the same tracking area. Multiple tracking areas can be assigned to a user equipment. A list of tracking areas IDs is stored in the user equipment and it is called TAI list.

In IDLE state the user equipment has no context in the radio access network (RAN) entities (e.g. eNodeB in E-UTRAN; NodeB and RNC in the UTRAN). In contrast, when the user equipment is in CONNECTED state the RAN entities have user equipment's context and an RRC connection between the user equipment and eNodeB is established. When a NAS signaling connection needs to be established between the user equipment and the MME, e.g. due to the tracking area update (TAU) procedure when moving to a new tracking area, the user equipment and the MME enter the NAS CONNECTED state. Initial NAS messages that initiate a transition from IDLE to CONNECTED state are for example an Attach Request, a Tracking Area Update (TAU) Request, a Service Request or a Detach Request. In order to send the initial NAS message, the user equipment first needs to establish a Radio Resource Control (RRC) connection to the eNodeB over the Uu interface. During the RRC connection establishment the user equipment and eNodeB get synchronized and establish one or more Signaling Radio Bearers (SRB) that can be used for the transport of the NAS messages.

When the radio access network (usually the eNodeB) detects that the user equipment is not sending/receiving data, the radio access network (usually the eNodeB) decides to release the radio resources and the S1 connection, and as a result, the user equipment transits from CONNECTED to IDLE state. Also the MME changes its internal state for the user equipment to IDLE and informs the SGW to release the 51-U connection to the eNodeB.

Please note that the above described IDLE and CONNECTED states are related to the NAS layer state diagram. On the other hand, in the Access Stratum (AS) layer the IDLE and CONNECTED states are also defined. The AS IDLE and CONNECTED states are analogical to NAS IDLE and CONNECTED states, i.e. if the RRC connection is established, the AS state is CONNECTED, otherwise if the RRC connection is released, the AS state is IDLE. The IDLE and CONNECTED states are used in the state diagrams in the AS and NAS layers.

Machine Type Communication

3GPP has started an activity on Network Improvements for Machine Type Communication (MTC) with the service requirements in 3GPP TS 22.368, "Service requirements for Machine-Type Communications (MTC)" version 11.0.0, December 2010 and a study of possible architecture solutions in 3GPP TS 23.888; "System Improvements for Machine-Type Communications"; version 1.0.0, July 2010 (both documents being available at http://www.3gpp.org and being incorporated herein by reference). The MTC terminals or MTC devices are characterized that they are usually not operated by human being and the communication peer is another machine, e.g. so called MTC server or another MTC terminal(s).

The MTC has some specifics that are different from the usual human-to-human communication. 3GPP tries to identify these specifics in order to optimize the network operations. These specifics are called "MTC features" and are explained in 3GPP TS 22.368. For example, one such MTC feature can be "infrequent transmission" meaning that the MTC device that belongs to that feature can send or receive data irregularly, i.e. with long period between two data transmissions. There is a requirement that after the data transmission is completed, the MTC device shall return to offline (i.e. to enter DEREGISTERED state).

The requirement "return offline" (i.e. to enter DEREGISTERED) for MTC devices means that they should be detached when not communicating. The reason for that requirement is that from terminal perspective the terminals can save energy (e.g. no need to perform periodic NAS signaling and cell reselection procedure), especially if the terminals are battery driven. From the network perspective, when the terminals are detached they do not generate any signaling (e.g. a terminal in IDLE state would periodically send updates to the MME), and further, no resources are occupied in the network (e.g. context stored in the MME, SGW and PGW).

SUMMARY OF THE INVENTION

One object of the invention is to suggest a new mechanism for detaching mobile terminals (e.g. a MTC device, but not limited thereto) from a mobile communication network. Furthermore, another object of the invention is to suggest a mechanism for reducing the control signaling in a detachment procedure of a mobile terminal from a mobile communication network. A further object is to find a suitable trigger mechanism for triggering a detachment of mobile terminals (e.g. a MTC device, but not limited thereto) from a mobile communication network.

The object is solved by the subject matter of the independent claims. Advantageous embodiments of the invention are subject to the dependent claims.

According to a first aspect of the invention it is proposed to initiate the detachment of a mobile terminal (e.g. a MTC device, but not limited thereto) from a mobile communication network in response to the mobile terminal being transferred from a connected state to idle state. This must however not be the only event causing a detachment of the mobile terminal.

In case a certain event is to initiate the detachment of the mobile terminal, the event should be either known to all nodes involved in the detachment procedure and/or signaling to notify one or more nodes involved in the detachment procedure may be foreseen. One further sub-aspect of this first aspect of the invention is to ensure that at least the mobile terminal and at least a control node in the core network of the mobile communication network, which is terminating the mobile terminal's signaling (control plane) towards the core network (also denoted mobility management entity herein) are aware of the triggering condition so that the detach procedure can be coordinated among the mobile terminal and the mobility management entity. Therefore, according to this sub-aspect, the mobility management entity may inform the mobile terminal that it has to detach from the mobile communication network by sending a detach request message. The mobile terminal may optionally respond to this detach request message by sending a detach accept message to confirm the detach command from the mobility management entity.

Another aspect of the invention is considering that it may not be reasonable to immediately detach the mobile terminal while the mobile terminal is in connected state, since there could be (still) uplink data and/or downlink data or signaling to be transmitted from/to the mobile terminal. It is therefore proposed to detach the mobile terminal in deferred manner, for example upon expiry of a given time span. The deferral may also be relative to a certain event, which is either observable by mobile terminal and/or the control node (i.e. mobility management entity) or which is notified to mobile terminal and/or the control node in order to ensure synchronization. For example, one event could be the mobile node going into idle state. This event may be known at least to the mobile terminal; the control node could be notified thereon by a signaling message. For instance, the mobile terminal could notify the control node or a base station (also denoted Node B or eNode B in the 3GPP terminology) to which the mobile terminal is connected and which is aware of the event may notify the control node.

The deferral of the detachment procedure may be for example controlled by a detach timer, which is running in the mobile terminal and the control node (i.e. mobility management entity). In case of using a deferred detachment procedure, it may be desirable to coordinate the detach timers of mobile terminal and the control node, so that both detach the mobile terminal from the mobile communication network (approximately) at the same point in time. In this context coordination of the detach time is also advantageous, in case mechanisms like access barring or new uplink data to be sent by the mobile terminal may lead to an interruption or reset of the detach timer.

An exemplary embodiment of the invention provides a method for detaching a mobile terminal from a mobile communication network. According to this method a detach procedure for detaching the mobile terminal from the mobile communication network is initiated. The initiation of the detach procedure is triggered by a transition of the mobile terminal from connected state to idle state.

There are different possibilities how the detach procedure can be initiated. In one embodiment of the invention the detach procedure is initiated by receiving at the mobile terminal a detach request message from a mobility management entity using non-access stratum signaling. The signaling of a non-access stratum message implies that the mobile terminal is in connected state.

In a more detailed exemplary implementation of this embodiment, the transmission of the detach request message from the mobility management entity is triggered by an expiry of an inactivity timer for the mobile terminal maintained by a base station to which the mobile terminal is connected. Further, the inactivity timer in the base station is mobile terminal specific (i.e. the inactivity timer of each mobile terminal may be set individually or group wise). In another exemplary implementation, the setting of the inactivity timer may alternatively or additionally depend on a configuration of the mobile terminal.

In another embodiment of the invention, the detach request message is transmitted in response to a trigger indicating the mobile terminal to be transited from a connected state to an idle state. For instance, this trigger could be a notification that is sent from a base station to which the mobile terminal is connected to the mobility management entity, upon the base station deciding that the mobile terminal is to be entered into idle state and initiates a corresponding signaling procedure, e.g. a signaling procedure that releases the mobile terminal's radio access related context information in the radio access network of the mobile communication network.

Another option for initiating the detach procedure in response to the mobile terminal to enter into idle state is that the detach procedure is initiated by receiving at the mobility management entity a detach request message from the mobile terminal using non-access stratum signaling. In this option, the mobile terminal initiates the detachment.

In another embodiment of the invention, a detach accept message is transmitted in response to the detach request message. The detach accept message is sent to confirm reception of the detach request message. The detach accept message may for example be used to ensure synchronization between mobile terminal and mobility.

According to a further embodiment of the invention, the detachment of the mobile terminal is not executed immediately, e.g. in direct response to the signaling of the detach request message (and the response thereto), but the execution of the detach procedure is deferred by a given time span. This may be advantageous as it would allow the mobile terminal and/or the network to transfer further user data or control data until the detachment of the mobile terminal.

In one exemplary implementation of this embodiment, the initiated detach procedure is performed autonomously after expiry of the given time span, i.e. detachment is implicit. An autonomous, respectively, an implicit detachment of the mobile terminal means that the mobile terminal and the mobility management entity do not exchange any signaling at the point in time of executing the detachment.

According to another embodiment, a deferred detachment of the mobile terminal can be controlled by means of a detachment timer. The mobile terminal starts a detach timer at the mobile terminal. The detach timer is initialized to the detach timer value corresponding to the given time span. The mobile terminal autonomously detaches the mobile terminal from the mobile communication network upon expiry of the detach timer at the mobile terminal.

Likewise, also the network, respectively the mobility management entity, may also start a detach timer for the mobile terminal, which is initialized to the detach timer value corresponding to a given time span. The mobility management entity detaches the mobile terminal from the mobile communication network upon expiry of the detach timer at the mobility management entity.

In one exemplary and more detailed implementation, the detach timer may be started in response to receiving a detach request message or detach accept message. Alternatively or in addition, the detach timer could be also (re)started in response to the mobile terminal transiting to idle state.

Regarding the configuration/setting of the detach timer value, there are also several options. For example, the detach timer value may be:

signaled in a detach request message using a non-access stratum protocol, signaled in a detach accept message using a non-access stratum protocol, in case the mobile terminal or the mobility management entity would like to modify the timer value, broadcast within system broadcast information received by the mobile terminal by a base station serving same, comprised in subscription information of the mobile terminal available to the mobility management entity serving the mobile terminal, or pre-configured.

As already briefly indicated above, other embodiments of the invention, the detach timer may also be interrupted in response to certain event. For example, the detach timer could be interrupted in both, the mobile terminal and the mobility management entity, while the mobile terminal is in connected state. When transiting back to a idle state, the detach timer could then be reinitialized and started or simply restarted as noted previously herein.

Another event which may interrupt the detach timer in the mobile terminal and the mobility management entity, may be for example access barring being applied by base station at which the mobile terminal is camping in idle mode. The detach timer could be for example interrupted for the time period of access barring being applied.

In case of access barring being applied, the mobile terminal may for example determine begin and end of the period of access barring being applied by the base station from broadcasted system information broadcast by the base station. Furthermore, in case the base station decides on whether access barring is applied or not, according to another exemplary implementation, the base station may inform the mobility management entity on begin and end of the applied access barring in the base station's radio cell.

Alternatively, the mobility management entity may be the entity that triggers access barring within some given radio access area (i.e. a cell controlled by a base station) and informs the one or more base stations accordingly on begin and end of the access barring period. The base station(s) may in turn inform the mobile terminals in their cell(s) on access barring being applied via system broadcast. In this case, the mobility management entity would be immediately aware of the period of time where access barring is applied and could interrupt the detach timer accordingly.

In another exemplary embodiment of the invention, in case uplink data is to be sent by the mobile terminal during access barring being applied by a base station at which the mobile terminal is camping in idle mode, the mobile terminal—nevertheless—enters into connected state and transmits a detach timer update request message to the mobility management entity to increase the period of time until detachment. The mobility management entity may respond to the detach timer update request message with sending a detach timer update response message setting an updated time span after which the mobile terminal has to autonomously detach from the mobile communication network. This updated time span may correspond to the period in time suggested by the mobile terminal, or a time span selected by the mobility management entity.

In another embodiment of the invention, the trigger for the initiation of the detach procedure is part of a base station-initiated signaling procedure for releasing the resources for the mobile terminal in the radio access network. Such signaling procedures may be for example used within the mobile communication network to cause the mobile terminal to be transited from connected state into idle state within the network.

A further embodiment of the invention suggests that the mobility management entity initiates the detach procedure of the mobile terminal only in case the cause for the transit of the mobile terminal from the connected state to the idle state is inactivity of the mobile terminal.

Moreover, for a deferred detachment of the mobile terminal, the time span (respectively the timer value) after expiry of which the mobile terminal is detached could be determined based on several parameters. For example, the time span is determined by the mobility management entity based on at least one of:
- whether the mobile terminal's communication that caused the mobile terminal entering connected state has been triggered by downlink or uplink data
- a duration of the last connected state of the mobile terminal or and average duration of the connected state of the mobile terminal,
- a number of connected state to idle mode transitions of the mobile terminal during the current attachment to the mobile communication network, and
- MTC features of the mobile terminal.

Another embodiment of the invention is related to a mobile terminal for use in a mobile communication network. The mobile terminal comprises a receiver unit that receives at the mobile terminal a detach request message from a mobility management entity using non-access stratum signaling. The mobile terminal may be further equipped with a transmitter unit in order to be able to respond to the detach request message with sending a detach accept message to the mobility management entity. The mobile terminal may further have a processing unit for starting a detach timer. The detach timer may be initialized to the detach timer value corresponding to a given time span upon expiry of which the mobile terminal has to detach from the mobile communication network. Further, the mobile terminal's processing unit detaches the mobile terminal from the mobile communication network by deleting context information of the user plane and control plane in the mobile communication network.

In a more detailed exemplary embodiment, the mobile terminal's receiver unit determines the detach timer value from the detach request message or based on a pre-configuration of the mobile terminal.

Moreover, in another exemplary more detailed embodiment, the processing unit of the mobile terminal interrupts the detach timer while the mobile terminal is in connected state and/or while access barring is applied by a based station at which the mobile terminal is camping in idle mode.

In another embodiment of the invention, the mobile terminal's processing unit starts the detach timer in response to the reception of the detach request message, in response to the transmission of the detach accept message or in response to the processing unit triggering a transition of the mobile terminal from connected state to idle state.

The mobile terminal according to a further more detailed embodiment of the invention enters into connected state and its transmitter unit transmits a detach timer update request message to the mobility management entity to increase the period of time until detachment, in case uplink data is to be sent by the mobile terminal during access barring being applied by a base station at which the mobile terminal is camping in idle mode. The mobile terminal' receiver unit receives from the mobility management unit an optional detach timer update response message setting an updated time span after which the mobile terminal has to autonomously detach from the mobile communication network.

A further embodiment of the invention is providing a mobility management entity for detaching a mobile terminal from in a mobile communication network. The mobility management entity comprises a receiver unit for receiving from a base station connected the mobile terminal an indication that the mobile terminal is to transit to idle state, and a transmitter unit for transmitting, in response to the indication received from the base station, a detach request message to the mobile terminal using non-access stratum signaling. The mobility management entity's receiver unit receives, in response to the detach request message, a detach accept message from the mobile terminal, and the mobile terminal's processing unit starts a detach timer which is initialized to the detach timer value corresponding to a given time span upon expiry of which the mobile terminal has to detach from the mobile communication network, Moreover, the mobility management entity's processing unit causes the deletion of context information of the mobile terminal's user plane and control plane in the mobile communication network to detach the mobile terminal from the mobile communication network. This may include the processing unit deleting context information of the mobile terminal's user plane and control plane within a storage of the mobility management entity and/or notifying another core network entity to delete the mobile terminal's user plane and control plane related context information.

The mobility management entity's processing unit could be further adapted to determine the detach timer value for the mobile terminal and the transmitter unit is adapted to include the detach timer value in the detach request message. Moreover, in a further example, the processing unit interrupts the detach timer while the mobile terminal is in connected state and/or while access barring is applied by a based station at which the mobile terminal is camping in idle mode.

In another embodiment of the invention, the receiver unit of the mobility management entity receives an indication of begin and end of the applied access barring in a base station's radio cell from the base station.

The processing unit of the mobility management entity could optionally be adapted to start the detach timer in response to the transmission of the detach request message, in response to the reception of the detach accept message or in response to the receiving unit receiving the indication that the mobile terminal is to transit to idle state.

In another embodiment of the invention, the mobility management entity's receiver unit receives a detach timer update request message from the mobile terminal that is requesting to increase the period of time until detachment and its transmitter unit transmits to the mobile terminal a detach timer update response message setting an updated time span after which the mobile terminal has to autonomously detach from the mobile communication network.

In another embodiment the mobile terminal and/or the mobility management entity are/is adapted to perform the steps of a method for detaching a mobile terminal from a mobile communication network according to one of the various embodiments described herein.

Further embodiments of the invention relate to the implementation of the aspects of the invention in software. Accordingly, another embodiment of the invention is providing a computer-readable medium storing instructions that, when executed by a processor of a mobile terminal, cause the mobile terminal to receive a detach request message from a mobility management entity using non-access stratum signaling, and to send in response to the detach request message a detach accept message to the mobility management entity. The mobile terminal is further caused by the execution of the instructions to initialize a detach timer to a detach timer value corresponding to a given time span upon expiry of which the mobile terminal has to detach from the mobile communication network, and to start the detach timer. Furthermore, the execution of the instructions cause the mobile terminal to detach the mobile terminal from the mobile communication network by deleting context information of the user plane and control plane in the mobile communication network.

Another embodiment of the invention is related to a computer-readable medium storing instructions that, when executed by a processor of a mobility management entity, cause the mobility management entity to detach a mobile terminal from in a mobile communication network, by receiving from a base station connected the mobile terminal an indication that the mobile terminal is to transit to idle state; transmitting, in response to the indication received from the base station, a detach request message to the mobile terminal using non-access stratum signaling; receiving a detach accept message from the mobile terminal in response to the detach request message; initializing a detach timer to a detach timer value corresponding to a given time span upon expiry of which the mobile terminal has to detach from the mobile communication network; starting the detach timer; and causing the deletion of context information of the mobile terminal's user plane and control plane in the mobile communication network to detach the mobile terminal.

A further embodiment of the invention is related to a computer readable medium that stores instructions that when executed by a mobile terminal or a mobility management entity, cause same to perform a method for detaching a mobile terminal from a mobile communication network according to one of the various embodiments described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
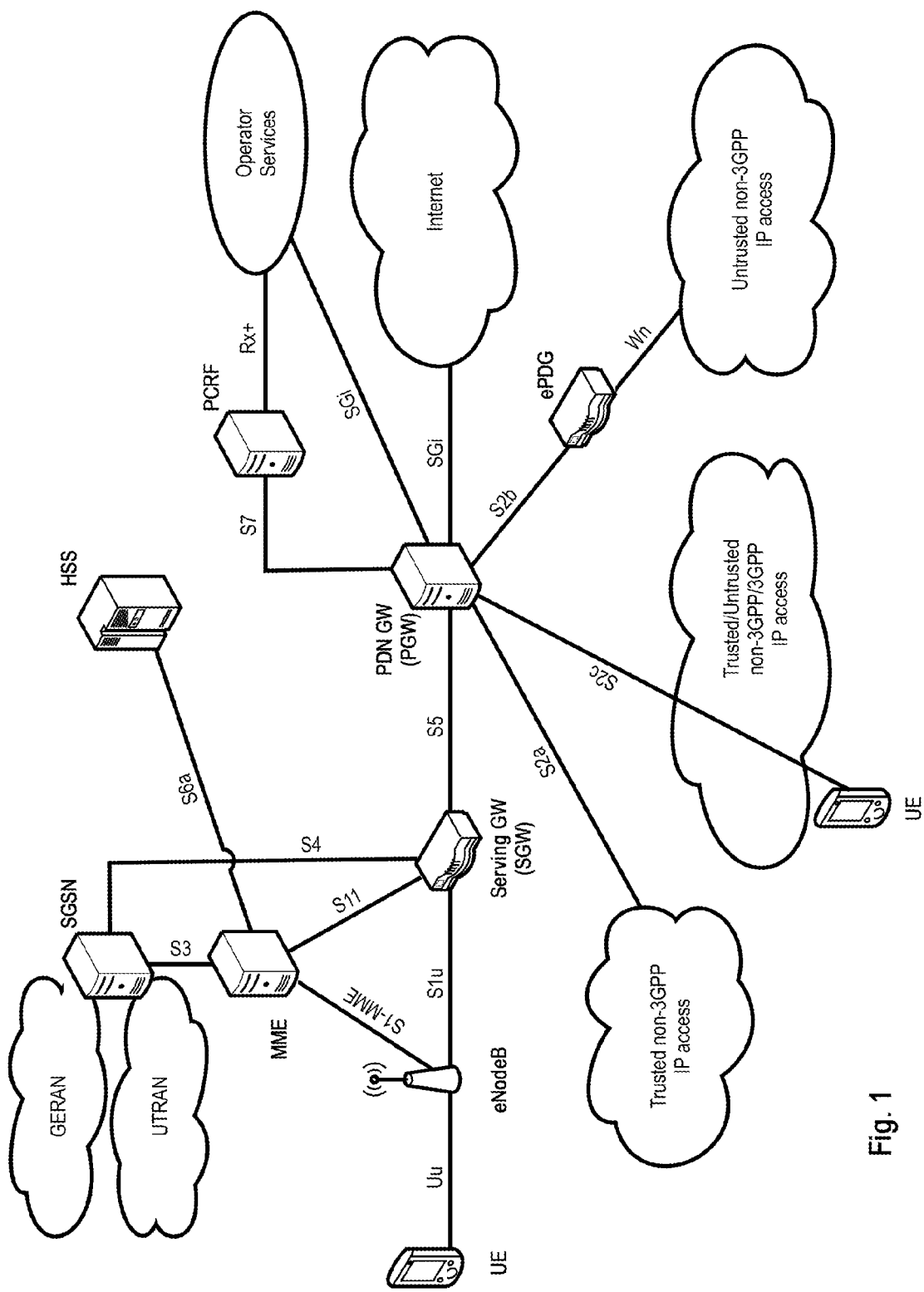
FIG. 1 shows an exemplary architecture of a 3GPP LTE system.

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication networks discussed in the Technical Background section above. It should be noted that the invention may be advantageously used for example in connection with a mobile communication network such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

As has been indicated in the Technical Background section, MTC devices are required to detach from the mobile communication network when not communicating. There could be several possible solutions for forcing a MTC Device to detach after the communication is completed. For example, the MTC application in the MTC device or in the MTC server can have an explicit API (Application Programming Interface) to announce the end of the communication to the communication unit respectively in the MTC device or MTC server. If such an API is available in the MTC device, the MTC device can initiate the detach procedure to transfer to DEREGISTERED state. Another possibility would be that in case the MME is aware about the end of the communication, the MME can initiate the explicit detach procedure, i.e. the MME sends detach request message to the MTC device and the MTC device responds with detach accept. For instance, the MME can learn about the end of the communication if the MTC server explicitly informs the MME.

Both options require an API that allows informing the protocol layers below the MTC application layer of the MTC device and/or MTC server on the end of the communication. If the MTC application in the MTC application layer running in the MTC device and/or in the MTC server doesn't implement the capability to inform lower layers about the end of the communication, other solutions then the described above are needed to ensure that the MTC device detaches from the mobile communication system when communication is completed.

Further, even if the MME could be somehow informed about the end of the communication and would like to initiate the detach procedure and if the MTC device is in IDLE state, the MME needs to perform firstly the paging procedure so that the MTC device needs to establish NAS connection with the MME. Afterwards the MME can send detach request message. Such a mechanism results in increased signaling. It would be desirable that for MTC devices implementing the "return offline" feature detaching from the network after communication ends is possible without invoking additional signaling overhead, e.g. due to paging and establishing a NAS connection.

In the following different embodiments of the invention below relate to a new detachment mechanism that is allowing a MTC device to detach from the mobile communication network, once communication has ended, i.e. to implement a return offline" feature. The detachment mechanism according to the various embodiments described herein should however not be considered limited for use in detaching MTC devices; the detachment mechanism may be used to ensure that mobile terminals in general get detached from the mobile communication network, once communication ended.

With respect to the detachment of mobile terminals from a mobile communication network, one question is which event(s) should cause the mobile terminal to detach from the mobile communication network. This question is linked to the implementation of a "return offline" feature, since an appropriate event is to be determined which allows to trigger the detachment of the mobile terminal once its communication ended. According to a first aspect of the invention it is proposed to initiate the detachment of a mobile terminal (e.g. a MTC device, but not limited thereto) from a mobile communication network in response to the mobile terminal being transferred from a connected state to idle state. This must however not be the only event causing a detachment of the mobile terminal.

In case a certain event is to initiate the detachment of the mobile terminal, the event should be either known to all nodes involved in the detachment procedure and/or signaling to notify one or more nodes involved in the detachment procedure may be foreseen. It may be assumed without loss of generality that in case of a non-abnormal transition of a mobile terminal to a deregistered state (i.e. detaching the mobile terminal from the mobile communication network) the mobile terminal is registered in the mobile communication network (registered state). It may be assumed that at least two nodes of the network are involved in the detachment procedure: the mobile terminal to be detached from the network (i.e. that is to transit to a "deregistered" state) and a control node in the core network of the mobile communication network, which is terminating the mobile terminal's signaling (control plane) towards the core network. This control node is also referred to a mobility management entity herein and—is in one embodiment of the invention—the same named entity (MME) as known in the core network of a 3GPP based system.

Accordingly, one sub-aspect of this first aspect of the invention is to ensure that at least the mobile terminal and the control node are aware of the triggering condition so that the detach procedure can be coordinated among the mobile terminal and the mobility management entity. Therefore, according to this sub-aspect, the mobility management entity may inform the mobile terminal that it has to detach from the mobile communication network by sending a detach request message. The mobile terminal may optionally respond to this detach request message by sending a detach accept message to confirm the detach command from the mobility management entity. This could be referred as explicit detach as explicit signaling is exchanged between the mobile terminal and the mobility management entity.

Another option is to implement an implicit coordination of the detach procedure between mobile terminal and mobility management entity that may require no explicit NAS signaling for the initiation of the detachment. This option is used today for handling the mobile terminal's detachment in abnormal cases, e.g. loss of connectivity. Here, an implicit detach may be used for normal cases of detachment, i.e. in situations where the mobile terminal and the mobility management entity are both aware of the event to trigger the detachment of the mobile terminal. Formulated differently, an implicit detachment may be used in cases where the mobile terminal and the mobility management entity are synchronized to perform implicit detach.

In both options above, if there are further network nodes that are involved in the detachment procedure, same may be either informed by the mobility management entity about the detachment of the mobile terminal or may be also aware of the event that is triggering the detachment.

Furthermore, consider for exemplary purposes that an event causing a detachment of the mobile terminal is triggered at a point in time where the mobile terminal is in idle state, i.e. is unknown to the radio access network, respectively, its serving control node in the core network responsible for terminating the non-access stratum (NAS) protocols in the control plane (including e.g. mobility management) is not aware of its point of attachment on a cell-level (e.g. it may only be aware of the tracking area comprising multiple cells in which the mobile terminal is located). Hence, to finally detach the mobile terminal, a connection has to be reestablished via the radio access network in order to trigger the NAS procedure for detaching the mobile terminal, which may be considered an undesirable signaling overhead.

A further consideration connected is that it may not be reasonable to immediately detach the mobile terminal while the mobile terminal is in connected state, since there could be (still) uplink data and/or downlink data or signaling to be transmitted from/to the mobile terminal. It may thus be advantageous to detach the mobile terminal in deferred manner, which in turn yields that the mobile terminal and the mobility management entity are to be synchronized to perform the deferred detach procedure. The synchronization can be twofold: on one hand a common point in time to start the deferred detach should be known in the mobile terminal and in the network; and on the other hand a common time span used to delay the detach procedure should be used in the mobile terminal and in the network.

In accordance with these considerations, it is another aspect of the invention reducing the control signaling overhead for detaching a mobile terminal in the mobile communication network. The initiation of the detach procedure may be performed while the mobile terminal is in connected state, i.e. there no reestablishment of a radio access network connection may be necessary. According to this aspect, the detach procedure may be deferred, meaning that the detachment takes place at a later point in time than the associated control signaling (i.e. for example the transmission of a detach request message and the optional response thereto, i.e. detach accept message). In other words, the detachment of the mobile terminal occurs after expiry of given time span. As noted above, the deferral may also be relative to a certain event, which is either observable by mobile terminal and/or the control node (i.e. mobility management entity) or which is notified to mobile terminal and/or the control node in order to ensure synchronization. For example, one event could be the mobile node going into idle state. This event may be known at least to the mobile terminal; the control node could be notified thereon by a signaling message. For instance, the mobile terminal could notify the control node or a base station (also denoted Node B or eNode B in the 3GPP terminology) to which the mobile terminal is connected and which is aware of the event may notify the control node.

The deferral of the detachment procedure may be for example controlled by a detach timer, which is running in the mobile terminal and the control node (i.e. mobility management entity). In case of using a deferred detachment procedure, it may be desirable to coordinate the detach timers of the mobile terminal and the control node, so that both detach the mobile terminal from the mobile communication network (approximately) at the same point in time. In this context coordination of the detach time is also advantageous, in case mechanisms like access barring or new uplink data to be sent by the mobile terminal may lead to an interruption or reset of the detach timer.

Also the detach timer value may need to be coordinated, between mobile terminal and control node. This may be for example achieved by pre-configuration in the mobile terminal and/or including a timer value to be used in the subscription information of the mobile terminal. Another option may be signaling the detach timer value from the control node to the mobile terminal (or vice versa). The detach timer value may for example be included in the detach request message, a detach accept message, or alternatively in an attach request message sent during initial attach of the mobile terminal to the mobile communication network.

Furthermore, the deferred detach procedure allows to avoid of additional (NAS) control signaling upon the actual time of detachment. For example, assuming for exemplary purposes that the mobile terminal is in idle mode once the detach timer expires, the coordination of the detach procedure by means of the detach timer in mobile terminal and the control node allows that no further signaling related to the detachment of the mobile terminal needs to be exchanged between the mobile terminal and the control node, and hence, there is no need to transit the mobile terminal to connected state for detachment. Instead, upon expiry of the detach timer, the mobile terminal autonomously deletes the context information related to its user plane and control plane in the mobile communication network, thereby detaching therefrom.

Similarly, also the control node, e.g. mobility management entity, can delete the mobile terminal's context information related to its user plane and control plane in the mobile communication network. This deletion of the mobile terminal's context information may involve the control node informing one or more further core network nodes that maintain context information related to user plane and control plane of the mobile terminal to be detached (e.g. a PDN-GW in a 3GPP system), so that this/those core network node(s) can also delete the context information related to user plane and control plane of the mobile terminal for detaching the mobile terminal.

As already indicated in the foregoing paragraphs, the detachment of the mobile terminal from the mobile communication network is equivalent to deleting the mobile terminal's user plane and control plane context information maintained by the mobile terminal and within the mobile communication network. In one exemplary implementation, the idle state of the mobile terminal implies that radio access related context information, i.e. context information of the mobile terminal related to the radio access network connection are deleted in the radio access network node(s) an the mobile terminal, while user plane and control plane context information of the mobile terminal are still maintained by the mobile terminal and within the core network mobile communication network. The detachment of the mobile terminal ensures that this user plane and control plane context information of the mobile terminal maintained in the mobile terminal and the core network are deleted.

In one more detailed exemplary embodiment, the invention is implemented in a mobile communication network that has an architecture of a 3GPP EPS network. The core network is implemented as EPC network that is able to connect radio access network technology according to the 3GPP GPRS, UTRAN or E-UTRAN architecture. Hence, in this embodiment the definitions of idle state and deregistered state (as entered by detaching the mobile terminal from the network) are defined as in the Technical Background section of this document.

Furthermore, in another exemplary embodiment, the mobile terminal to be detached from the mobile communication network is a machine type communication device (MTC device) as discussed in the Technical Background section of this document.

As mentioned above, in an idle mode transfer procedure (i.e. a procedure triggered to transfer a mobile terminal to idle mode) may be used as a trigger event to perform a deferred detach procedure. The deferred detach procedure may be initiated by the mobile communication network, for example a mobility management entity serving the mobile terminal. The mobility management entity may signal a new "detach timer" parameter in a detach request message sent to the mobile terminal. The "detach timer" represents the time, after which the mobility management entity and the mobile terminal have to perform the implicit detach procedure, i.e. autonomously delete the mobile terminal's context information on user plane and control plane in the core network nodes and the mobile terminal, without any additional NAS signaling between mobility management entity and mobile terminal.

During the detach timer is running the mobile terminal and the mobile communication network behave as usual, i.e. if there is pending uplink or downlink data, the mobile terminal or respectively the network can initiate the data bearer establishment and transmit the data.

In one exemplary implementation, the mobile terminal may transfer from idle state to connected state and vice-versa, without impact on the running detach timer. In another exemplary implementation, the detach timer runs only while the mobile terminal is in idle state, i.e. the detach timer is interrupted once the mobile terminal is entering into connected state and is resumed once the mobile terminal enters idle state (again). In yet another exemplary implementation, the detach timer can be terminated (i.e. cleared) when the mobile terminal (and correspondingly the mobility management entity) enters the CONNECTED state. Furthermore, as will become more apparent from the following, the detach timer may be controlled taking into account several further conditions, e.g. radio access being barred within a cell or the core network is congested during the detach timer is running.

The following exemplary embodiments of the invention are described in detail assuming EPC/E-UTRAN system. However, the ideas and principles of this invention are also applicable to the UTRAN/UMTS system as regards radio access. The protocol procedures in UTRAN/UMTS architecture would be the same, though the message structure may be different. It is further to be noted that although it is referred to a user equipment in the following, i.e. the 3GPP term for a mobile terminal, the different embodiments of the invention may be advantageously applied to MTC device as referred to in the Technical Background section. Similarly, the expression or feature of "return offline" means that the user equipment is detaching from the mobile communication system when the data communication has been completed.

The different embodiments of the invention described in the following are further focusing on a deferred detach procedure, which can be e.g. used to implemented the before mentioned "return offline" feature for MTC devices.

As there may be mobile devices in the mobile communication system that support and do not support the "return offline" feature, the mobility management entity may decide for the respective mobile device whether a deferred detach procedure is supported or not. For example in the mobile communication network as exemplified in FIG. 1, the "return offline" configuration of a user equipment could be for example stored in the subscription database, which may be maintained in the HLR/HSS. During the attach procedure of a user equipment, the mobility management entity may obtain the mobile terminal's configured features from the subscriber database.

Another possibility would be that in case the "return offline" feature, i.e. deferred detaching is supported by the user equipment, the user equipment informs the mobility management entity on its configuration (capabilities) during the attach procedure with the mobility management entity. For example, the so-called "capabilities exchange" between the user equipment and mobility management entity during the attach procedure could be used to inform the mobility management entity on the supported features of the user equipment, including its support of the "return offline" feature.

Similarly, also the mobility management entity can use the attach procedure with the user equipment to inform the user equipment on whether the network, respectively, the mobility management entity supports the "return offline" feature. Another possibility to inform the user equipment on the network' capabilities may be an extended TAU procedure between the mobility management entity and the user equipment, where one of the messages of the TAU procedure is modified to indicate the mobility management entity supporting a deferred detach procedure or not.

Having learned by the mobility management entity whether the user equipment supports deferred detach, the mobility management entity may decide to use a deferred detach procedure and may—depending on the implementation—send the "detach timer" for deferred detach in the detach request message to the user equipment.

Alternatively, a deferred detach procedure can also be initiated by the user equipment, e.g. by the user equipment sending a detach request with a "detach timer" to indicate that the detach is to be deferred. In case the user equipment initiates a deferred detach from the network by sending a detach request message indicating the desired time span until detachment, information from the user equipment with respect to the expected duration of the communication session can be taken into account to configure the detach timer.

For example the user equipment may know that some further data may arrive within a certain time interval, but no data will arrive beyond this time interval. In this case, the user equipment can send the deferred detach request message while still being in CONNECTED state. Later the network can trigger the user equipment to enter IDLE state and the mobile communication network and the user equipment can detach the user equipment implicitly, i.e. without going to CONNECTED state again to trigger the user equipment's detachment explicitly.

In reply to the detach request message, the user equipment or mobility management entity (depending on which entity initiated the detach procedure) may optionally send a detach accept message. Whether the detach accept message is sent or not may for example depend on the reason for detach. For example, in one implementation, the detach accept message is sent in the cases described in section 9.9.3.7 ("detach type") of 3GPP TS 24.301; "Non-Access-Stratum (NAS) protocol for Evolved Packet System (EPS)"; version 10.1.0, December 2010 (available at http://www.3gpp.org and incorporated herein by reference).

In one exemplary embodiment of the invention, the user equipment sends a detach accept message in reply to a detach request message (including the "detach timer") received from its mobility management entity, in order to acknowledge the acceptance of the "detach timer". In case the mobility management entity does not receive the detach accept message from the user equipment, and in a more advanced exemplary implementation, the mobility management entity may retransmit the detach request message one or several times. If no reply is received from the user equipment, the mobility management entity could then assume that the user equipment is unreachable and may detach the user equipment locally without deferral (i.e. without applying the "detach timer"). Please note that an "implicit detach timer" may be specified in the mobility management entity. According to the 3GPP TS 24.301 this implicit detach timer starts in the mobility management entity when the user equipment's state changes from CONNECTED to IDLE. The timer value of the implicit detach timer may be a couple of minutes longer than the timer in the mobility management entity for controlling periodic tracking area updates from the user equipment. In one exemplary implementation the "implicit detach timer" could be set to the "detach timer" value included in a detach request message after the detach accept message from the user equipment has been received at the mobility management entity.

Figure 2:
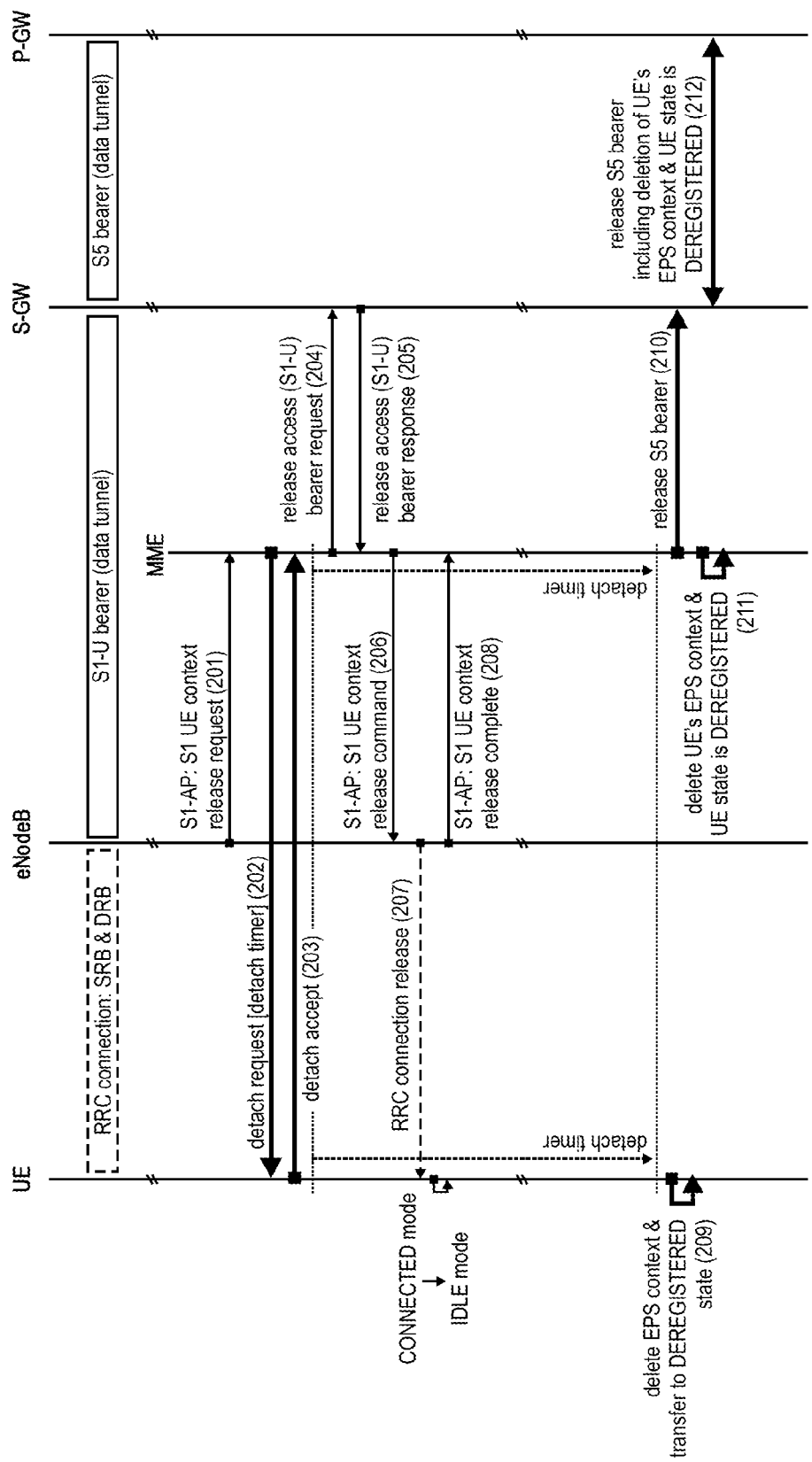
FIG. 2 shows an exemplary message exchange in an EPC/E-UTRAN based mobile communication network for triggering a deferred detach procedure and executing same according to an exemplary embodiment of the invention.

FIG. 2 shows an exemplary exchange of signaling messages between a user equipment UE and the mobile communication system for implementing a deferred detach procedure according to an exemplary embodiment of the invention. Initially, it is assumed that the user equipment UE is in CONNECTED state, i.e. a RRC connection with one or more signaling radio bearers (SRB) and data radio bearers (DRB) is established towards the radio access network (terminated by the eNodeB). In the user plane, there is a S1-U bearer established between the radio access network (eNodeB) and the core network (serving gateway S-GW) and there is further a S5 bearer established between the serving gateway S-GW and the PDN gateway P-GW in the core network. In the user plane, the mapping of DRBs and S1-U bearers is typically one-to-one. The mobility management entity MME and the serving gateway S-GW may be considered to form the "gateways" between radio access network and core network for the control plane and user plane, respectively.

The eNodeB starts 201 an AS "IDLE state triggering procedure" which is supposed to trigger the NAS deferred detach procedure by the mobility management entity MME. The IDLE state triggering procedure may be implemented as an "S1 release" procedure described in section 5.3.5 of 3GPP TS 23.401.

The eNodeB sends 201 a S1 UE context release request of the S1-AP protocol to signal the mobility management entity MME that it wishes to transit the user equipment UE to IDLE state (i.e. the user equipment UE is still in CONNECTED state at this point in time). There can be different reasons for an IDLE state triggering procedure initiated by the eNodeB. For example, there may be problems on the radio link, e.g. failure of the radio connection, or integrity check error of the RRC messages which trigger the IDLE state triggering procedure, or the IDLE state triggering procedure could be due to user inactivity, i.e. there was no uplink and downlink data on any of the user equipment's bearers for a given period of time.

In the exemplary embodiment shown in FIG. 2, this message by the eNodeB triggers the mobility management entity MME to initiate a deferred detach procedure of the user equipment UE (see bold arrows) in the NAS. As noted above, after the eNodeB initiates the IDLE state triggering procedure, by informing the mobility management entity MME to release the S1-U bearers by sending the S1-AP message "S1 UE context release request". This S1-AP message "S1 UE context release request" may indicate a release cause. The S1 release cause informs the mobility management entity MME about the reason for the IDLE state triggering procedure. In one exemplary embodiment of the invention, the mobility management entity MME initiates a following deferred detach procedure only, in case the release cause is user inactivity. If the release cause is different from user inactivity, the mobility management entity MME may continue with the S1 release procedure (steps 204 to 208) without performing the deferred detach procedure.

In general, in the 3GPP standards, the inactivity timer is the same for all user equipments attached to the respective eNodeB. In one embodiment of the invention, it is assumed that the eNodeB may have different values for the inactivity timer for different types of user equipments or runs a separate inactivity timer for each user equipment. For example, the inactivity timer value may be stored in the respective user equipment's context signaled from the mobility management entity MME to the eNodeB and the inactivity timer value is stored in the eNodeB during the lifetime of the RRC connection of the given user equipment.

In one example implementation, user equipments configured with the "return offline" feature (i.e. supporting a deferred detach procedure) may have different inactivity timer values than user equipment not supporting this feature. The inactivity timer value set for a user equipment or group of user equipments may also be depending on the MTC application. For instance, the inactivity timer values may be stored in the subscription database. Alternatively, the inactivity timer values could be derived by the mobility management entity MME or the eNodeB depending on the eNodeB's load. In the latter case it is sufficient that the mobility management entity MME could inform the eNodeB about the user equipment type and the eNodeB can derive a user equipment type specific value for the inactivity timer. The "user equipment type" is meant to denote the type of communication and/or application (having particular characteristics) for which the user equipment is subscribed. For example one "user equipment type" could be MTC device, which has different characteristics, and thus different inactivity timer values, from a normal user equipment operated by a human. Another example could be that user equipment subscribed or using for real-time or streaming services has different inactivity timer values from user equipment subscribed or using data-only services. Further, MTC devices subscribed for different MTC features could be regarded as different "type" of user equipment.

After the MME receives the "S1 UE context release request" having a user inactivity release cause and the UE is subscribed/configured for the "return offline" feature, the MME may decide to perform the deferred detach procedure. The mobility management entity MME sends 202 a detach request message to the user equipment. The detach request message is sent using a NAS protocol. The detach request message may indicate a timer span after expiry of which the user equipment UE and the mobility management entity MME implicitly detach the user equipment UE. The time span may be for example indicated by a timer value to be used for a detach timer as indicated in step 202.

The value of the detach timer in the user equipment's context in the mobility management entity MME (e.g. the mobility management entity MME obtains the timer value together with the other context parameters from the subscriber database) or the mobility management entity MME could calculate the timer value. If the detach timer value is stored in the user equipment's context, e.g. in the subscription, it is possible to also configure that value in the user equipment UE. The configuration of the user equipment UE may be for example implemented via the USIM card (i.e. stored in the USIM card) or during the NAS exchange with the mobility management entity MME during the attach procedure. Another alternative to configure the user equipment UE with the timer values of the detach timer for a deferred detach procedure may be the use of OMA DM (Open Mobile Alliance Device Management) or OTA (Over The Air) terminal management protocols.

If the detach timer value is pre-configured/stored in the user equipment UE, there is of course no need to signal the timer value in the detach request message. It is sufficient that the detach request message from the mobility management entity MME somehow informs the user equipment UE whether the detachment is a normal and hence immediately detach procedure (i.e. no detach timer is used) or whether the detach procedure should be a deferred detach (i.e. the detach timer is used). For this purpose a flag in the detach request message could be foreseen that is informing the user equipment UE accordingly.

Another option to inform the user equipment UE on the type of detach may be that the mobility management entity MME and the user equipment UE negotiate during the attach procedure whether the deferred detach procedure is to be assumed by the user equipment UE when receiving a detach request message or not. After the negotiation a "non-extended" detach request message (i.e. a detach message without flag and timer value) can trigger the deferred or normal detach procedure as agreed between the user equipment UE and the mobility management entity MME.

In case the user equipment UE receives the detach request message containing detach timer value, the user equipment UE stores the timer value and may optionally generate and transmit 203 a detach accept message to the mobility management entity MME. The detach accept message acknowledges not only the reception of the detach request message but also the detach timer. If the user equipment UE is not supporting a deferred detach procedure, i.e. doesn't implement the capability "return offline", the user equipment UE can inform the mobility management entity MME accordingly by means of the detach accept message. In this case, the mobility management entity MME could send a new state-of-the-art conform detach request message without a detach timer, if the mobility management entity MME wishes to immediately detach the user equipment UE from the network.

After the mobility management entity MME completes the NAS signaling exchange with the user equipment UE regarding the deferred detach procedure, the mobility management entity MME can proceed further with the S1 release procedure. The mobility management entity MME and serving gateway S-GW exchange 204, 205 release access bearer request and response messages over the S11 interface (see FIG. 1) in order to release the user plane bearers (i.e. the S1-U bearers) between the eNodeB and the serving gateway S-GW (i.e. the respective user equipment's context on the S1-U bearers are deleted in the S-GW). Thereupon, the mobility management entity MME exchanges 206, 208 S1-AP messages S1 UE context release command and complete with the eNodeB, which also causes the eNodeB to delete the S1-U bearer context of the user equipment UE). The eNodeB sends 207 a RRC connection release message to the user equipment UE to inform about the termination of the radio connection (signaling radio bearers SRB and data radio bearers DRB) and the eNodeB deletes the user equipment's radio access related context. Usually the RRC connection release procedure is performed by the eNodeB, i.e. the user equipment UE may not need to perform any signaling during the RRC connection release.

On the user equipment UE side, the user equipment UE also deletes the RAN related context information of the RRC connection and enters from CONNECTED state into IDLE state. The mobility management entity MME upon reception of the S1 UE context release complete message transfers the user equipment UE to be in IDLE state.

It should be noted that the exact point in time at which the eNodeB and mobility management entity MME delete the user equipment's context information may be implementation dependent and may differ from the points in time indicated in the example above. Furthermore, in case of using an UTRAN architecture (instead of an E-UTRAN architecture), the radio network entities (e.g. NodeB, RNC) would need to release the user equipment's context.

The NAS detach request message 202 sent by the mobility management entity MME to the user equipment UE can reset the inactivity timer in the eNodeB. It may be assumed that the reset of the inactivity timer in the eNodeB doesn't have impact on the IDLE mode triggering procedure, because the S1-AP "S1 UE context release command" (step 206) triggers the RRC connection release even if the inactivity timer is running, i.e. has not expired. However, in one exemplary embodiment of this invention, the inactivity timer in the eNodeB is not re-activated (i.e. reset) by the detach request message and detach accept message, respectively.

In the exemplary embodiment illustrated in FIG. 2, it is assumed that the detach timer is started by the user equipment UE and the mobility management entity MME upon sending, respectively receiving the detach accept message of step 203. It should be noted that also other events, such as the signaling/reception of the detach request message or the user equipment UE entering IDLE mode (see steps 207 and 208) could start the detach timer in the user equipment UE and the mobility management entity MME. Once the detach timer expires the user equipment UE and mobility management entity MME perform an implicit detach procedure locally in the user equipment UE and the mobility management entity MME. The user equipment UE deletes 209 the context information (i.e. the EPS and EMM context, security context, etc.) and transfers to DEREGISTERED state. The mobility management entity MME deletes 211 the user equipment's context (i.e. EPS context) and triggers 210 the serving gateway S-GW to release the S5 bearer by sending a corresponding signaling message. The serving gateway S-GW performs 212 a signaling exchange with the PDN gateway P-GW to releases the S5 bearer(s) of the user equipment UE, including the deletion of the corresponding context on the released S5 bearer(s). Please note that the mobility management MME may keep a part of the UE context (e.g. the user equipment's subscription data). Furthermore, the mobility management entity MME may also inform the subscription repository (HSS/HLR) that the user equipment UE is detached (not shown in FIG. 2).

In one exemplary embodiment of the invention, the detach request message is signaled to the user equipment UE together with the S1-AP procedure for releasing the RRC connection. For example, the detach request message can be piggybacked to the S1-AP "S1 UE context release command" message (step 206) to the eNodeB. The detach request message and detach accept message between the eNodeB and user equipment UE may then be exchanged in the "downlink information transfer" and "uplink information transfer" RRC messages. Finally, eNodeB informs the user equipment UE on the RRC connection release and acknowledge the release by S1-AP "S1 UE context release complete" message to the mobility management entity MME.

In the exemplary embodiment described with respect to FIG. 2 above, the mobility management entity MME may control the setting of the detach timer value. The user equipment UE could also assist the network in determining the detach timer value. For example, within the detach accept message, the user equipment UE may include an updated timer value or a multiplication factor, e.g. 1.3 or 1.5 or the like, for the timer value signaled by the mobility management entity MME, in case the user equipment UE knows that the timer value received from the mobility management entity MME is not sufficient and the user equipment UE knows how long it needs to transmit/receiving data when sending the detach accept message.

In case the user equipment UE knows that time span indicated by the detach timer value is not sufficient, but does not know how long it needs to transmit data when sending detach accept message, the user equipment UE could alternatively, e.g. shortly before the detach timer expires, extend the detach timer in the mobility management entity MME. This may be for example implemented by the user equipment UE sending an NAS attach request message, NAS service request message or a NAS TA update request message to the mobility management entity MME which indicates that the detach timer as previously set by the mobility management entity MME should be reset or multiplied with a given factor.

In both cases, the mobility management entity MME may optionally acknowledge the changed detach timer as indicated by the user equipment UE. One possibility is to introduce a new NAS detach complete message sent from the mobility management entity MME to the user equipment UE which is confirming the user equipment's proposed new detach timer/reset of the detach timer or which is setting a new detach timer for the user equipment. However, in order to avoid additional signaling, it is also possible to use existing signaling messages to let the user equipment UE know that the mobility management entity MME has accepted the changed timer. For example, the mobility management entity MME may indicate in the UE context release command to the eNodeB (step 208) whether the detach timer update was successful or not, e.g. by means of a new cause value (e.g. "successful UE detach timer update") that is also transferred

207 from the eNodeB to the user equipment UE in the RRC connection release in a cause or extension field of the RCC connection release message.

Regarding the setting of the detach time value, there may be different options how to determine same. If the detach timer value is calculated, the mobility management MME or eNodeB may take various parameters into account. Some parameters that can be used in the calculation of the detach timer value are listed below:

The duration of the CONNECTED state: The detach timer value may be proportional to the duration of the last CONNECTED state of the respective user equipment. For instance, the longer the last CONNECTED state was, the longer the detach timer value is set. It may be assumed that the duration of the CONNECTED state of a user equipment is proportional to the amount of data that was exchanged, and thus, since large data was exchanged, maybe there could be still some remaining amount of data to be exchanged. In an alternative implementation, the detach timer value may be inversely proportional to the duration of the last CONNECTED state of the respective user equipment. Since a large amount of data was already exchanged, it can be expected that the amount of data left for transmission is low. In another alternative implementation, the mobility management entity MME or eNodeB calculating the detach timer value may have information about the amount of data commonly sent by the user equipment, e.g. by pre-configuration or history information, and can base the detach timer value on this information to ensure that the user equipment can send the "usual" amount of data.

The number of CONNECTED—IDLE transitions: For example in case the deferred detach procedure is initiated after the first CONNECTED-to-IDLE state transition of the user equipment, it could be assumed that the user equipment may still have some data to exchange. Hence, so that the detach timer value can be longer. In case the user equipment already was IDLE state several times during its registration in the network, the mobility management entity MME or eNodeB can assume that the possible remaining data to exchange is less and the detach timer value can be shorter.

The user priority or the priority of the EPS bearer: If the priority or QoS class of the EPS bearer is higher, the mobility management entity MME or eNodeB may set a longer detach timer value.

Whether the ongoing communication that caused the current transfer to CONNECTED state was initiated by the network or by the user equipment (or in other words, whether the RRC establishment cause was mobile terminated or mobile originated data): For example, if the communication was mobile originated data, it could be assumed that the user equipment's uplink data was available in the user equipment when the communication was initiated and there could be no more outstanding data when the IDLE state is triggered by the eNodeB. In this case, the detach timer can be set to low value, or even omitted, i.e. immediate detach may be is performed (e.g. using a normal detach procedure triggered by the IDLE state transition procedure for the user equipment). In case the communication was initiated by the network via paging and downlink data was a request from the MTC server to the user equipment, the user equipment may still gather data to send in the uplink (e.g. GPS data). In this case the mobility management entity MME or eNodeB may set the detach timer value to a higher value in order to grant to the user equipment sufficient time before expiry of the detach timer causes the implicit detach.

Subscribed MTC features: the user equipment, i.e. MTC device in this cass, can be subscribed for MTC specific features, such as for example a "small data" feature and "time-controlled" feature implemented by an MTC device which may impact the calculation of the detach timer value:

The MTC feature "small data" means that the user equipment exchanges only small data with the MTC Server. In this case, the mobility management entity MME or eNodeB could assume that the user equipment UE most probably has transmitted the data during the CONNECTED state and no large data is outstanding. Hence, when the IDLE state is triggered by the eNodeB, a short value can be set for the detach timer. In the extreme case, the detach timer value can be set to zero for user equipments that implement the MTC feature "small data", or the mobility management entity MME could decide to use a normal (non-deferred) detach procedure for user equipments that implement the MTC feature "small data".

The MTC feature "time-controlled" means that the user equipment is allowed to establish connection to the network and communicate with the MTC server within a given time period, called "grant interval" (see also section 5.9.1 of 3GPP TS 23.888). There is also a so called "forbidden interval" during which the user equipment is not allowed to establish connection to the network (or not allowed to attach to the network). Further there could be a so called "communication window" which is the real communication period within the "grant interval". When determining the value for the "detach timer", the mobility management entity MME or eNodeB may take the "grant interval", "forbidden interval" and "communication window" into account. For example, if the user equipment is configured/subscribed for a "time-controlled" feature, the mobility management entity MME or eNodeB may record the time when the user equipment attaches to the network. When the IDLE state triggering procedure is initiated by the eNodeB, the mobility management entity MME or eNodeB can calculate the "detach timer" value as the remaining time until the communication window expires. Optionally some guard time (e.g. 10% or 30% longer) can be included in the detach timer value, in case of worse radio conditions when the user equipment needs longer time to send/receive the data. One alternative could be to calculate the detach timer value considering the end of the grant interval.

Of course the mobility management entity MME or eNodeB may consider one or more of the above noted parameters and also other parameters can be considered in calculating the detach timer value.

Once the signaling exchange for deferred detach procedure (see for example steps 202 and 203 of FIG. 2) is completed and the detach timer is running, the user equipment UE and mobility management entity MME can perform a local detach of the user equipment upon the timer's expiry, i.e. local deletion of the EPS bearer context, Mobility Management context and transfer to the DEREGISTERED mobility state without explicit signaling. However, during the detach timer is running some unexpected conditions may occur. One such condition could be the barring of the radio access, known as Access Class Barring (ACB) and described in 3GPP TR 23.898, "Access Class Barring and Overload Protection (ACBOP)", version 7.0.0, April 2005 and 3GPP TS 36.331, "Radio Resource Control (RRC)", version 9.3.0, June 2010 (both available at http://www.3gpp.org and incorporated herein by reference). In 3GPP, there was a topic similar to ACB to specify access barring for UEs configured as low-priority devices. This activity was called Extended Access Barring (EAB) and the plan is to specify it for Release 11. Herein, the term access barring (AB) is used, which could include the ACB as well as the EAB or any other access barring method.

The access barring in the RAN is usually triggered by management protocols initiated by the network operator. However, it is also possible that the access barring is triggered by the mobility management entity, e.g. by sending a S1-AP Overload Start message to one or more eNodeBs.

In general, access barring may be applied to different access classes of user equipments. The broadcasted system information by the eNodeB includes information for which access class the barring is applied. For example, user equipments belonging to the police, fire brigade or government officials may be assigned a higher access class, so that in case of access barring, those user equipments can still access the network. Also, in case of emergency calls, the user equipments may be allowed to omit the access baring.

In one exemplary embodiment of the invention, a new access barring can be introduced based on traffic class or application. If the user equipment initiates a communication for a lower traffic class, the user equipment can be barred, however, if the communication is initiated for a higher traffic class, then the access barring may not be applicable. This could be also referred to as "traffic class barring". The term access barring as used herein also encompasses "traffic class barring".

Figure 3:
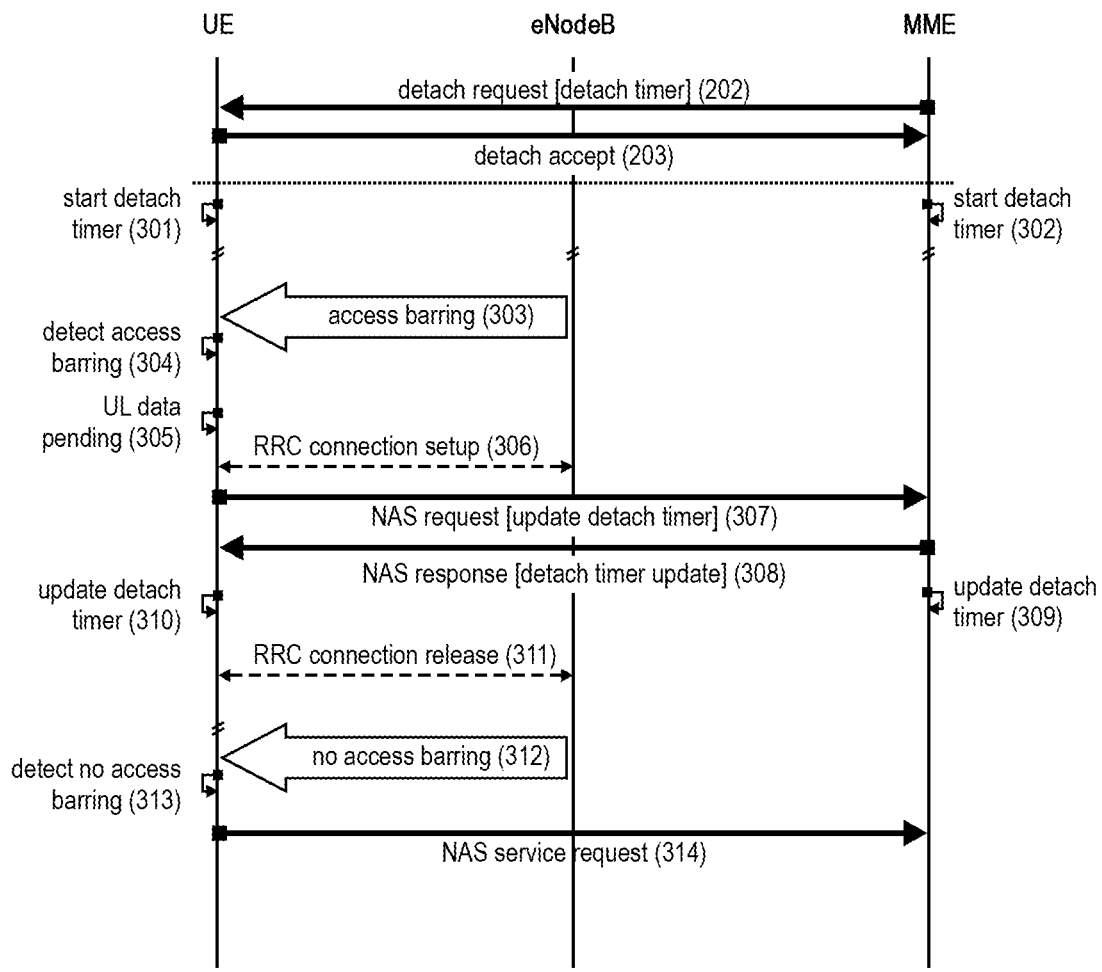
FIG. 3 shows a message exchange between a user equipment UE and a mobility management entity MME according to an exemplary embodiment of the invention to account for access barring within the user equipment's cell and synchronize the detach timer.

FIG. 3 exemplarily shows an exchange of messages according to an embodiment of the invention for handling access barring in a radio cell where a user equipment to perform a deferred detach procedure is camping. If the detach timer is running (see steps 301 and 302) and the radio access network starts 303 access barring, the user equipment probably may not be able to establish data connection, if there is pending uplink data. In such a situation when the access barring lasts longer than the detach timer, the user equipment will probably not be able to transmit the data when the teach timer expires and the user equipment needs to perform an attach procedure after the access barring is over. This would result in increased signaling and resource utilization in the network.

To avoid this problem, one solution could be to stop the detach timer during the interval the access barring is taking place. Please note that "timer stopping" means that the timer is hold on, i.e. the current timer value is stored and the timer is not deactivated/deleted. Stopping the detach timer can be for example implemented through configuration in the user equipment UE and in the mobility management entity MME, assuming that both the user equipment UE and mobility management entity MME know or detect the start and end of the access barring interval, so that the synchronization of the detach timer in the user equipment UE and in the mobility management entity can be guaranteed. However, if this is not the case, e.g. the mobility management entity MME doesn't know about the start of access barring, another solution is needed to stop the detach timer in user equipment UE and mobility management entity MME synchronous.

In FIG. 3, the user equipment UE may for example detect 304 from the system broadcast information within its cell (in which it may camp in IDLE mode) that the serving eNodeB applies access barring. In case uplink data are pending 305 for transmission in while access barring is applied in the radio cell, the user equipment UE may establish 306 the RRC connection (i.e. enter into CONNECTED state) and sends 307 a signaling message to the mobility management entity MME to inform it to the stop the detach timer or to update the timer with longer value.

In FIG. 3 the user equipment UE—after detecting the access barring—sends 307 a NAS message to inform the mobility management entity MME to update the detach timer. There are several further options at what time point the user equipment UE sends the NAS request message in step 307: For example, one option is to send the NAS request message in response to access barring being detected or when there is pending uplink data and access barring is applied, the latter option being shown in FIG. 2. When the mobility management entity MME receives 307 the NAS message, it stops or updates 309 the detach timer and acknowledges 308 the action to the user equipment UE by sending a NAS response message to the user equipment UE. The user equipment UE also updates 310 its local detach timer according to the NAS response message and may optionally release 311 the RRC connection again for reverting from CONNECTED state to IDLE state. One option for implementation of the NAS messages between the user equipment UE and mobility management entity MME can be to use modified TAU request and TAU accept messages.

If the user equipment UE proposes a new updated value for the detach timer, the mobility management entity MME may have the power to modify (increase or decrease) the proposed value, since the mobility management entity MME may know background information about the access barring period, e.g. how long the core network could be congested. In this case, the mobility management entity MME may signal 308 in the NAS reply message the updated detach timer value. The user equipment UE then updates 310 its detach timer with the value proposed by the mobility management entity MME. Optionally the user equipment UE may acknowledge the acceptance of the updated value by another NAS complete message to the mobility management entity MME (not shown in FIG. 3). Please note that the NAS reply message with updated detach timer from mobility management entity MME and NAS complete message from user equipment UE may only be sent, if the detach timer is indeed updated. If the detach timer is stopped during the access barring process, the mobility management entity MME doesn't need to include "updated timer" in the NAS reply message and the user equipment doesn't need to send NAS complete.

Usually the user equipment is not allowed (e.g. depending on a barring factor) to establish RRC connection during the access barring period when the user equipment has uplink data and user equipment initiated signaling. In the 3GPP terminology these actions are called mobile originated data and mobile originated signaling. For the purpose of the present invention, the user equipment may be adapted to allow initiating the RRC connection establishment for mobile originated signaling, if the detach timer is running and if the access barring is broadcasted.

Once the access barring is ended, and the eNodeB informs 312 the user equipments in its cell(s) accordingly, the user equipment UE can detach 313 the end of the access barring within its cell. Thereupon, the user equipment may send 314 a NAS service request to enter into CONNECTED state again in order to send the uplink data pending for transmission. The user equipment UE may optionally apply a randomization timer in order not to start the data connection establishment immediately after the end of the access barring period, to thereby avoid numerous concurrent service requests from user equipments that need to transmit uplink data after the access barring ending in the cell(s).

Furthermore, the user equipment UE may restart the detach timer in response to detecting the end of the access barring in its cell. Furthermore, also the mobility management entity MME receiving 314 the NAS service request can detect based on the reception of this message that access barring is no longer applied in the user equipment's cell and may also restart the detach timer. Upon the detach timer expiring in user equipment UE and mobility management entity MME, both entities perform an implicit detach as described with respect to FIG. 2 above.

Figure 4:
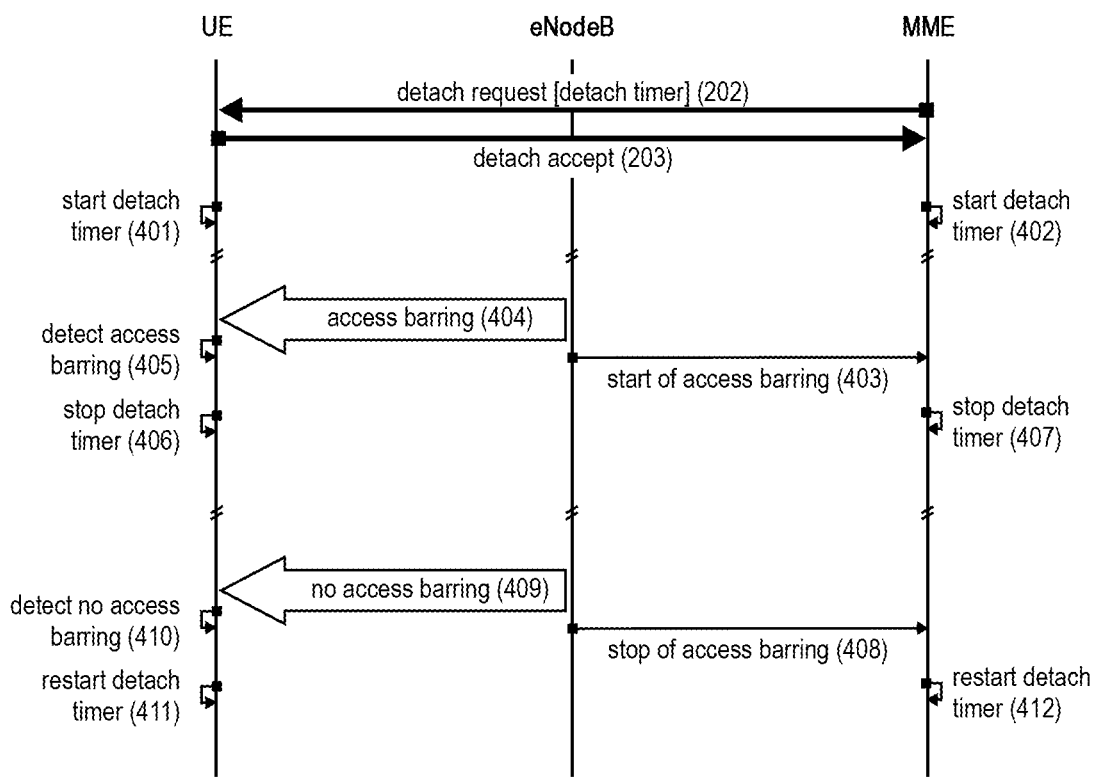
FIG. 4 shows another message exchange between a user equipment UE and a mobility management entity MME according to a further exemplary embodiment of the invention to account for access barring within the user equipment's cell and synchronize the detach timer.

In the example discussed with respect to FIG. 3, the synchronization of the detach timer is maintained by the user equipment UE explicitly informing the mobility management on the start and end of the access barring period. Another solution according to another exemplary embodiment of the invention the access barring period could be indicated by the eNodeB to the mobility management entity MME. An exemplary message exchange of such alternative solution is shown in FIG. 4. In the example of FIG. 4 it is again assumed that the user equipment UE and the mobility management entity MME have started 401, 402 the detach timer for a deferred detach of the user equipment.

When the eNodeB starts broadcasting 404 access barring being applied in its cell(s), the eNodeB also informs 403 the mobility management entity MME about this event. If there are multiple mobility management entities connected to the eNodeB (a so-called MME pool), the eNodeB informs all mobility management entities. The mobility management entity MME may perform internal check which of its served user equipments subscribed/configured for "return offline" feature are located in the (or these multiple) cell(s) controlled by the eNodeB and for which detach timer is running. The mobility management entity MME then stops 407 the detach timer for all user equipments (including user equipment UE) that are located in the one or more radio cells controlled by the eNodeB and for which the detach timer is running. Analogously, when the user equipment UE detects 405 the start of the access barring, the user equipment UE also stops 406 the detach timer. As in FIG. 3, the user equipment UE can learn from the system broadcast information whether access barring is applied or not.

After the access barring is over, the eNodeB informs 408 the mobility management entity MME on the end of the access barring and the mobility management entity MME resumes 412 the detach timer. The same happens in the user equipment UE side, i.e. when the user equipment UE detects 410 that the access barring is no longer broadcasted 409, the user equipment UE also resumes 411 the detach timer.

In case there was no data pending for transmission during the access barring period, the user equipment UE can detach, i.e. go into to DEREGISTERED state when the detach timer expires as explained previously with connection with FIG. 2. In case there was uplink data pending during the access barring period, the user equipment UE will initiate service request to establish a data connection after access barring is over as exemplified above with respect to FIG. 3. The user equipment UE may optionally apply a randomization timer in order not to start the data connection establishment immediately after the end of the access barring period, to thereby avoid numerous concurrent service requests from user equipments that need to transmit uplink data after the access barring ending in the cell(s).

One possible problem can occur may be that the user equipments move among cells in a tracking area and some of the cells apply access barring and other cells do not. As the user equipment moves in IDLE state, the mobility management entity MME does not know the exact radio cell where the user equipment is camping, so that the mobility management entity may not know whether the user equipment is camping in a cell where access barring is applied or not. This problem can occur for both solution explained with respect to FIGS. 3 and 4 above.

This problem may be solved in various fashions. In one exemplary embodiment of the invention, the user equipment UE may inform the mobility management entity MME—e.g. via NAS signaling—about the detected access barring and the resulted stop of detach timer. Please note that in the example message flow of FIG. 3 the user equipment UE and mobility management entity MME stop the detach timer implicitly, i.e. without explicit signaling. With other words, each time the user equipment detects beginning or end of an access barring, the user equipment UE performs NAS signaling procedure with the mobility management entity MME to stop or resume the detach timer. This is a reliable solution to keep the user equipment and mobility management entity synchronized with respect to the detach timer.

In the example of FIG. 4 and assuming for exemplary purposes that at least one cell of the user equipment's TAI list reports access barring, the mobility management entity MME may page the user equipment UE in order to change the tracking area of the user equipment UE. In situations that only a part of the cells of the user equipment's TAI list are under access barring and other cells are not, the mobility management entity MME may define a new tracking area for the user equipment UE so as to have the user equipment UE sending a TAU in case it enters a new cell. The mobility management entity MME could for example define the tracking are of the user equipment UE such that it covers only the cell the user equipment UE is located in, or covers the neighbor cells that either apply access barring or do not apply access barring. Grouping of cells based on whether they apply access barring or not may not always be practical, because depending on network configuration multiple cells use the same tracking area ID (TAI) and reconfiguring each cells with a separate TAI may be a considerable management burden for the operator. Another disadvantage of having a small tracking area (e.g. one cell only) is that the user equipment needs to perform TAU procedure very frequent.

According to another exemplary embodiment also targeting the problem of user equipments' movement in access barring scenarios as discussed above with respect to FIG. 4, the mobility management entity may stop the detach timer as soon as a cell part of the user equipment's TAI list is applying access barring. In analogous way, the user equipment also stops the detach timer when detecting access barring in its current cell. This may lead to a situation where the current cell where the user equipment is camping is not applying access barring and the user equipment thus does not stop the detach timer, but another cell part of the user equipment's TAI list applies access barring, so that the mobility management entity would stop the detach timer. In this situation the user equipment and mobility management entity would become desynchronized, as the detach timer in the user equipment continues to run, whereas the timer in the mobility management entity is stopped. The user equipment would thus detach and go to DEREGISTERED state earlier than the mobility management entity. This may not be an essential problem. However one may argue that the detach timers in the user equipment and mobility management entity do not run synchronized, which is not an optimal situation, as will be discussed further down below.

There could be several cases that the user equipment detaches from the network earlier than the mobility management entity:

In case of access barring, in case the mobility management entity stops the detach timer as soon as a cell of the user equipment's TAI list is applying access barring, it can happen that the mobility management entity stops the detach timer while the detach timer in the user equipment is running.

If the user equipment has multiple MTC applications and some of the applications can indicate the end of the data exchange, whereas other applications cannot, a general reliable solution would be to apply the deferred detach procedure specified in the present invention. However, in case that the MTC application in the user equipment can indicate end of data exchange to the UE's communication module (e.g. NAS layer), the user equipment could transfer to DEREGISTERED state well before the detach timer expires.

In general, if the user equipment locally detaches (transfers to DEREGISTERED state) earlier than the detach timer in the mobility management entity expires, there may be no substantial problems considering the uplink communication. However, considering the downlink communication, if there is downlink data to be transmitted, the mobility management entity would page the user equipment, but since the user equipment has locally detached, the mobility management entity will not receive response (e.g. NAS Service request) to the paging.

There may be situations, where the duration of a data communication is difficult to predict, e.g. in case of severe radio conditions. Also, in case a MTC application has difficulties to gather information to report to the MTC server, there could be a situation, where the user equipments spends longer time in IDLE state during the MTC data is gathered or processed on the application level. In these example situations, the mobility management entity may determine a value for the detach timer, which may not be long enough to transmit the MTC data.

To overcome the above possible shortcoming, according to another embodiment of the invention, the detach timer is therefore only running while the user equipment is in IDLE state. The user equipment can transfer between CONNECTED state and IDLE state, or vice versa, multiple times depending on the MTC application. Each time when the user equipment transfers from IDLE state to CONNECTED state, the detach timer is stopped in the user equipment and the mobility management entity (and the detach timer value is held/stored). When the user equipment transfers from CONNECTED state to IDLE state, the user equipment and the mobility management entity resume the detach timer, i.e. the detach timer continues to run from the value that was stored when the detach timer was stopped in the respective entity. The advantage of this exemplary embodiment may be that in case of slow data transmission the user equipment and network would have enough time to transmit the data independent of the detach timer. In one further scenario, where the detach timer is close to expire, but the user equipment still gathers data to send, the user equipment may initiate transfer from IDLE state to CONNECTED state even before the data is actually available. The transition to CONNECTED state may stop the detach timer, and thus, give the user equipment the opportunity to prolong the time before the (implicit or local) detach procedure is performed.

According to another exemplary embodiment of the invention, the detach timer is to always cleared/reset/terminated in the user equipment and mobility management entity when a transition from IDLE state to CONNECTED state for data communication occurs. In a variant of this exemplary embodiment, the detach timer may not be cleared/reset/terminated, in case the user equipment sends a TAU/RAU. Hence, after inactivity is indicated from the eNodeB, the mobility management entity may determine a new detach timer value taking into account the changed conditions since initiating the last deferred detach procedure. For example the mobility management entity could determine a new detach timer values based on one or more of the parameters for calculating the detach timer value outlined previously herein and may transmit a deferred detach request message to the user equipment again before the user equipment is send to IDLE state.

It has been suggested above that individual user equipments or groups of user equipments may have different values for inactivity timer maintained in their serving eNodeB. In another exemplary embodiment of the invention, this may obsolete the need for deferred detach procedure. Using individual timer values for the inactivity timer within the eNodeB, the IDLE state triggering procedure could be adapted to the MTC application characteristics to realize a "return offline" feature for a user equipment. Upon expiry of the user equipment's inactivity timer in the eNodeB, same may inform the mobility management entity in an IDLE state triggering procedure as described in connection with FIG. 2 above. Upon the mobility management entity being informed on a user equipment to be entered into IDLE state (i.e. the user equipment's inactivity timer expired), the mobility management entity may proceed with a state-of-the-art detach procedure to detach the user equipment from the network.

Alternatively, the different settings for inactivity timer for the user equipments may also interact with the deferred detach procedure. In another embodiment of the invention, the determining of the detached timer value can take into consideration the availability of the particular inactivity timer value. Thus, one possible implementation of a deferred detach procedure that does not require signaling of the detach timer value may be that the user equipment which is configured for deferred detach lets expire the periodic TAU timer and in response to the expiry of the TAU timer detaches implicitly from the network (i.e. without any signaling). Within the mobile communication network that supports deferred detach, the mobility management entity detaches the user equipment implicitly. If the "implicit detach timer" in the mobility management entity expires, the mobility management entity performs the implicit detach procedure in the mobile communication network.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for detaching a mobile terminal from a mobile communication network, the method comprising:
   initiating a detach procedure for detaching the mobile terminal from the mobile communication network,
   starting a detach timer at the mobile terminal, the detach timer being initialized to a detach timer value corresponding to a given time span, and
   autonomously detaching the mobile terminal from the mobile communication network upon expiry of the detach timer at the mobile terminal,
   wherein the initiation of the detach procedure is triggered by a transition of the mobile terminal from connected mode to idle mode, and
   wherein execution of the detach procedure is deferred by the given time span, and
   wherein the detach procedure is initiated by receiving at the mobile terminal a detach request message from a mobility management entity using non-access stratum signaling, the detach request message comprising the detach timer value.

2. The method according to claim 1, further comprising the step of transmitting a detach accept message to confirm reception of the detach request message.

3. The method according to claim 1, wherein the initiated detach procedure is performed autonomously after expiry of the given time span, where the mobile terminal and a mobility management entity do not exchange any signaling.

4. The method according to claim 1, further comprising the steps of:
   starting a detach timer at mobility management entity for the mobile terminal, the detach timer being initialized to the detach timer value corresponding to a given time span,
   wherein the mobility management entity detaches the mobile terminal from the mobile communication network upon expiry of the detach timer at the mobility management entity.

5. The method according to claim 1, wherein the detach timer is started in response to receiving a detach request message, detach accept message or in response to the mobile terminal transiting to idle state.

6. The method according to claim 1, wherein the detach timer value:
   is signaled in a detach request message using a non-access stratum protocol,
   is signaled in a detach accept message using a non-access stratum protocol, in case the mobile terminal or a mobility management entity would like to modify the timer value,
   is broadcast within system broadcast information received by the mobile terminal by a base station serving same,
   is comprised in subscription information of the mobile terminal available to the mobility management entity serving the mobile terminal, or
   pre-configuration of the detach timer value.

7. A mobile terminal for use in a mobile communication network, the mobile terminal comprising:
   a receiver unit for receiving at the mobile terminal a detach request message from a mobility management entity using non-access stratum signaling,
   a transmitter unit for responding to the detach request message with sending a detach accept message to the mobility management entity, and
   a processing unit for starting a detach timer, the detach timer being initialized to the detach timer value corresponding to a given time span upon expiry of which the mobile terminal has to detach from the mobile communication network,
   wherein the processing unit is adapted to detach the mobile terminal from the mobile communication network by deleting context information of the user plane and control plane in the mobile communication network, and
   wherein the receiver unit is adapted to determine the detach timer value from the detach request message or based on a pre-configuration of the mobile terminal.

8. The mobile terminal according to claim 7, wherein the processing unit is adapted to start the detach timer in response to the reception of the detach request message, in response to the transmission of the detach accept message or in response to the processing unit triggering a transition of the mobile terminal from connected state to idle state.

9. The mobile terminal according to claim 7, wherein the mobile terminal is adapted to enter into connected state and the transmitter unit is adapted to transmit a detach timer update request message to the mobility management entity to increase the period of time until detachment, in case uplink data is to be sent by the mobile terminal during access barring being applied by a base station at which the mobile terminal is camping in idle mode.

10. The mobile terminal according to claim 9, wherein the receiver unit is adapted to receive from a mobility management entity a detach timer update response message setting an updated time span after which the mobile terminal has to autonomously detach from the mobile communication network.

11. A mobility management entity for detaching a mobile terminal from in a mobile communication network, the mobility management entity comprising:
   a receiver unit for receiving from a base station connected to the mobile terminal an indication that the mobile terminal is to transit to idle state,
   a transmitter unit for transmitting, in response to the indication received from the base station, a detach request message to the mobile terminal using non-access stratum signaling,
   a receiver unit for receiving a detach accept message from the mobile terminal in response to the detach request message, and
   a processing unit for starting a detach timer, the detach timer being initialized to the detach timer value corresponding to a given time span upon expiry of which the mobile terminal has to detach from the mobile communication network,
   wherein the processing unit is adapted cause the deletion of context information of the mobile terminal's user plane and control plane in the mobile communication network to detach the mobile terminal from the mobile communication network, and wherein the receiver unit is adapted to determine the detach timer value from the detach request message.

12. The mobility management entity according to claim 11, wherein the processing unit is adapted to determine the detach timer value for the mobile terminal and the transmitter unit is adapted to include the detach timer value in the detach request message.

13. The mobility management entity according to claim 11, wherein the processing unit is adapted to start the detach timer in response to the transmission of the detach request message, in response to the reception of the detach accept message or in response to the receiving unit receiving the indication that the mobile terminal is to transit to idle state.

14. The mobility management entity according to claim 11, wherein the receiver unit is adapted to receive a detach timer update request message from the mobile terminal that is requesting to increase the period of time until detachment and the transmitter unit is adapted to transmit to the mobile terminal a detach timer update response message setting an updated time span after which the mobile terminal has to autonomously detach from the mobile communication network.

* * * * *